UNITED STATES PATENT OFFICE.

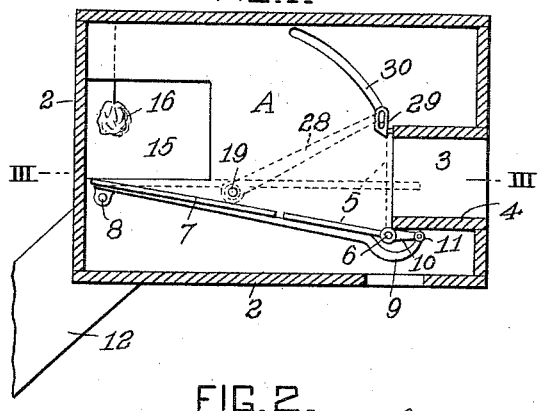

JOHN B. CESSNA, OF PITTSBURGH, PENNSYLVANIA.

ANIMAL-TRAP.

1,044,490.  Specification of Letters Patent.  Patented Nov. 19, 1912.

Application filed June 5, 1911. Serial No. 631,324.

*To all whom it may concern:*

Be it known that I, JOHN B. CESSNA, a citizen of the United States, residing at Pittsburgh, in the county of Allegheny and State of Pennsylvania, have invented certain new and useful Improvements in Animal-Traps, of which the following is a specification.

My invention consists of an improvement in animal traps and has for its object to provide a device which will entrap the animal, as a rat or mouse, and will also electrocute it and deliver the body outwardly from the interior, and then be automatically re-set.

The device comprises a chambered box having an entering and entrapping compartment provided with a trap door and an operating platform therefor, and a latch for holding the trap door closed. Also an electrocuting compartment having pivotally mounted insulated conducting plates adapted to be placed in series circuit with a source of current by the animal, an operating lever for said plates, a controlling solenoid magnet for the lever also adapted to be placed in series with said circuit, and various other features of construction, operable in the manner hereinafter more fully set forth.

The present invention constitutes an improvement in that type of animal trap forming the subject of my prior application for patent, filed March 14, 1911, Serial No. 614491.

It has for its object to provide means whereby the current may be maintained through the body of the animal for a sufficient time to effect complete electrocution. I have found that in the use of the ordinary current of 110 volts, the effect is not always complete unless continuously maintained for a short period. To such end I employ a thermostatically controlled solenoid magnet for actuating the trap mechanism, and means for establishing the current through the thermostat by wiring connections and contact mechanism, as hereinafter described.

In the drawings: Figure 1 is a vertical sectional view through the entrance chamber of the trap, indicated by the line I. I. Fig. 3. Fig. 2 is a similar view indicated by the line II. II. of Fig. 3. Fig. 3 is a horizontal section on the line III. III. of Fig. 1. Fig. 4 is a vertical cross section on the line IV. IV. of Fig. 3. Fig. 5 is a longitudinal vertical section on the line V. V. of Fig. 6, illustrating a modified construction. Fig. 6 is a horizontal section similar to Fig. 3 on the line VI. VI. of Fig. 5. Fig. 7 is a diagrammatic detail view of the thermostat.

The apparatus is of box form having suitable surrounding walls 2, the interior being divided into two main compartments A and B. The compartment A is provided with an entrance opening 3 leading in from the outside, preferably over a short stationary platform 4. Inwardly beyond said entrance opening is a door 5 pivoted at 6, while beyond said door is a platform 7 pivoted at 8 adjacent to the opposite wall. Said door and platform normally lie across the width of the entrance chamber A at a slight upward inclination, as in Fig. 1, and platform 7 extends along underneath the door 5 and is connected by a lever terminal 9 with an extension 10 of the door 5 at 11 by a loose joint, beyond the pivotal mounting 6 as shown. Chambers A and B are divided by a partition 14, apertured at 15 adjacent to the inner wall 2, a bait 16 being secured at a position best adapted to lure the animal upon platform 7 and opposite the aperture 15.

Within chamber B are conducting plates 17 and 18$^a$, 18$^b$, fixedly secured to the rock shaft 19, insulated from said shaft and from each other, extending transversely across the middle portion of chamber B at one side of said rock shaft. Plates 18$^a$, 18$^b$, are close together and are intended to operate as a single plate, but to be electrically connected only when the trap is occupied. For this purpose a thin resilient conducting plate 18$^c$ is secured to one of the plates, as 18$^b$ extending over and slightly above plate 18$^a$ as in Fig. 4, so as to be easily depressed thereon by the slight weight of an animal's fore feet. One of the plates, which are all rigidly connected to rock shaft 19, as 18$^a$, is provided with an arm 20 which is engaged by a terminal pin 21 of lever 22. Said lever is pivoted at 26 and is provided with a short arm 23 to which is pivotally connected the end of the armature bar of a solenoid magnet 24, preferably maintained in its extended position by a light spring 25. Extending from one of the plates, as 17, is an arm 28 having a loosely mounted latch 29 with a beveled terminal adapted to be engaged by the edge of the door 5 when it is thrown up as shown in dotted lines in Fig. 1. The latch is loosely mounted on the end of arm 28, or otherwise suitably constructed, to adapt it to automatic engagement with the door, as will be readily understood, and an arc shaped slot 30 is cut through the partition 14 for clearance.

31 is any source of electrical current as a generator, and 32 is a circuit closer, adapted to be placed in series with the current therefrom, when the contact plate $18^c$, secured to plate $18^b$, is depressed upon plate $18^a$. Circuit closer 32 consists of a coil $32^a$ of fine wire of limited conductivity and high resistance connected with conductor 35, surrounding a core $32^b$, and connected with conductor 36 by binding post terminal $32^c$. Core $32^b$ is expansible by heat and adapted to make contact by spring $32^d$ with a terminal $32^e$ of binding post $32^c$. When plate $18^c$ is depressed current is supplied to conductor 35 and coil $32^a$ which by its resistance heats core $32^b$ and closes the contacts $32^e$, $32^d$, establishing full current through the core $32^b$ to the solenoid 24. Circuit is closed from plate 17 through the body of the animal to plate $18^c$ and $18^a$, and connections 33, $33^a$ and 34. The circuit closer 32, when plate $18^c$ is depressed operates by expansion due to the heat of the current, to close a circuit through the solenoid 24 a sufficient length of time after the circuit is closed and maintained through the body of the animal, to insure electrocution, and to then operate the lever 22 to trip the plates to discharging position, shown in dotted lines in Fig. 2. By the circuit connections as shown, when the animal passes through opening 15 onto plate 17 and places its fore feet on thin plate $18^c$, it is depressed into contact with plate $18^a$, at the same time that direct circuit is established through its body from plate 17 to plates $18^c$ and $18^a$. Current passes by conductor 33 and branch $33^a$ to plate 17, thence through the animal to plate $18^c$ and $18^a$ and conductor 34, closing the circuit and establishing the shock. However, in order that the current may be maintained, the magnet 24 is not energized to actuate the plates by tipping until the current is established through the circuit closer 32. For such purpose plate $18^b$ is connected by conductor 35 to the circuit closer 32, which in turn is connected by conductor 36 with magnet 24, a branch $33^b$ of conductor 33 forming the other connection therefor.

It will be understood that the circuit closer 32 may be of any desired construction and adapted to be adjusted or set for operation to close the circuit through the magnet 24 at a longer or shorter period of time after the circuit is closed between plates 17 and $18^c$, by the body of the animal, acting as a conductor. The object of thus maintaining the electrocuting circuit is to supplement the effect by continuing the primary shock and insure effective action, and the thermostat thus acts to delay the action of the tripping magnet 24 to insure such result. After the circuit is thus established through magnet 24 it operates to tip the plates as indicated in dotted lines in Fig. 2 and to discharge the electrocuted body outwardly through the opening 12.

In Figs. 5 and 6 I have shown a somewhat modified construction in which the main elements as above described are present and identified by the same numerals, but in which the opening 15 from chamber A to chamber B is located somewhat backwardly from the end of the trap, as shown, and leads onto a tipping platform 37. Said platform is pivoted on a cross shaft 38 and is slightly counterweighted at its rear portion whereby to easily tip downwardly as indicated in dotted lines in Fig. 5, whereby to positively discharge the animal downwardly upon plates 17 and $18^c$. The plate 37 will then return to normal position by gravity of its rear end, which normally rests on a supporting bar 39, and the animal will thus positively be retained against escape. To insure closure of the space below plate 37, a narrow ledge 40 may be interposed, extending inwardly from the end wall 2 toward said plate as shown.

The construction and operation of the invention will be readily understood from the foregoing description. Its advantages result from the positive and continued maintenance of the current through the interposition of the thermostatic control of the actuating solenoid magnet for tripping the contact plates, whereby to insure a positive and regular operation of the device.

What I claim is:

1. An animal trap having a plurality of movable platforms of conducting material normally insulated one from the other, electrically operated means for actuating said platforms, a generator, and means for establishing circuit from the generator through said actuating means and two of said platforms when circuit is closed between all of the platforms by the weight and conductivity of an entrapped animal, substantially as set forth.

2. An animal trap having a plurality of movable platforms of conducting material normally insulated one from the other, electrically operated means for actuating said platforms, a generator, means for establishing circuit from the generator through said actuating means and two of said platforms when circuit is closed between all of the platforms by the weight and conductivity of an entrapped animal, and electrically actuated means interposed in said circuit adapted to delay the operation of said platform-actuating means, substantially as set forth.

3. In an animal trap, the combination of a casing, a plurality of tilting electrocution platforms therein of opposite polarity normally insulated one from the other and having a common pivotal bearing, a tilting lever for said platforms, an actuating magnet therefor, a generator, and means for establishing circuit therethrough from the generator when circuit is closed between two of the platforms by depressing one platform on the other, substantially as set forth.

4. In an animal trap, the combination of a casing, a plurality of tilting electrocution platforms therein of opposite polarity normally insulated one from the other and having a common pivotal bearing, a tilting lever for said platforms, an actuating magnet therefor, a generator, an electrically actuated circuit closer, and means for establishing circuit therethrough from the generator when circuit is closed between two of the platforms by depressing one platform on the other, substantially as set forth.

5. In an animal trap, the combination of a casing, electrically operated platform-actuating means therein, and a plurality of pivoted conducting platforms normally insulated one from the other and in operative connection therewith, one of said platforms embodying a lower plate and flexible upper contact plate adapted to make contact therewith, a generator, and means for establishing circuit therethrough when contact is made by the upper contact plate with the lower plate, substantially as set forth.

6. In an animal trap of the class described, the combination with electrically actuated operating mechanism, a source of current, a common pivotal support, and an operating lever fixedly connected therewith; of a plurality of contact plates normally insulated one from the other mounted on said support, and connections between the source of current and the contact plates and operating mechanism respectively, arranged for establishing a circuit through the operating mechanism when one of said plates is depressed into electrical contact with another of said plates, substantially as set forth.

7. In an animal trap of the class described, the combination with electrically actuated operating mechanism, an electrically actuated circuit closer in circuit therewith, a source of current, a common pivotal support, and an operating lever fixedly connected therewith; of a plurality of contact plates normally insulated one from the other mounted on said support, and connections between the source of current and the contact plates and operating mechanism respectively, arranged for establishing a circuit through the operating mechanism when one of said plates is depressed into electrical contact with another of said plates, substantially as set forth.

8. In an animal trap of the class described, the combination of a casing, a pivotal support, a plurality of plates of opposite polarity mounted on said pivotal support normally insulated one from the other and collectively constituting a tilting electrocution platform, an electrically operated device for tilting said platform, a source of current and connections thereto from said plates and tilting device, and a rigidly connected resilient contact member connected with one of said plates and adapted to be depressed into circuit-establishing contact with another of said plates, said contact member and plate operating to establish circuit through the platform tilting device, substantially as set forth.

In testimony whereof I hereunto affix my signature in the presence of two witnesses.

JOHN B. CESSNA.

Witnesses:
C. M. CLARKE,
FREDK. STAUB.

---

Copies of this patent may be obtained for five cents each, by addressing the "Commissioner of Patents, Washington, D. C."